Sept. 29, 1936.  W. H. BASELT  2,055,959
CLASP BRAKE
Filed Dec. 28, 1935  2 Sheets-Sheet 1
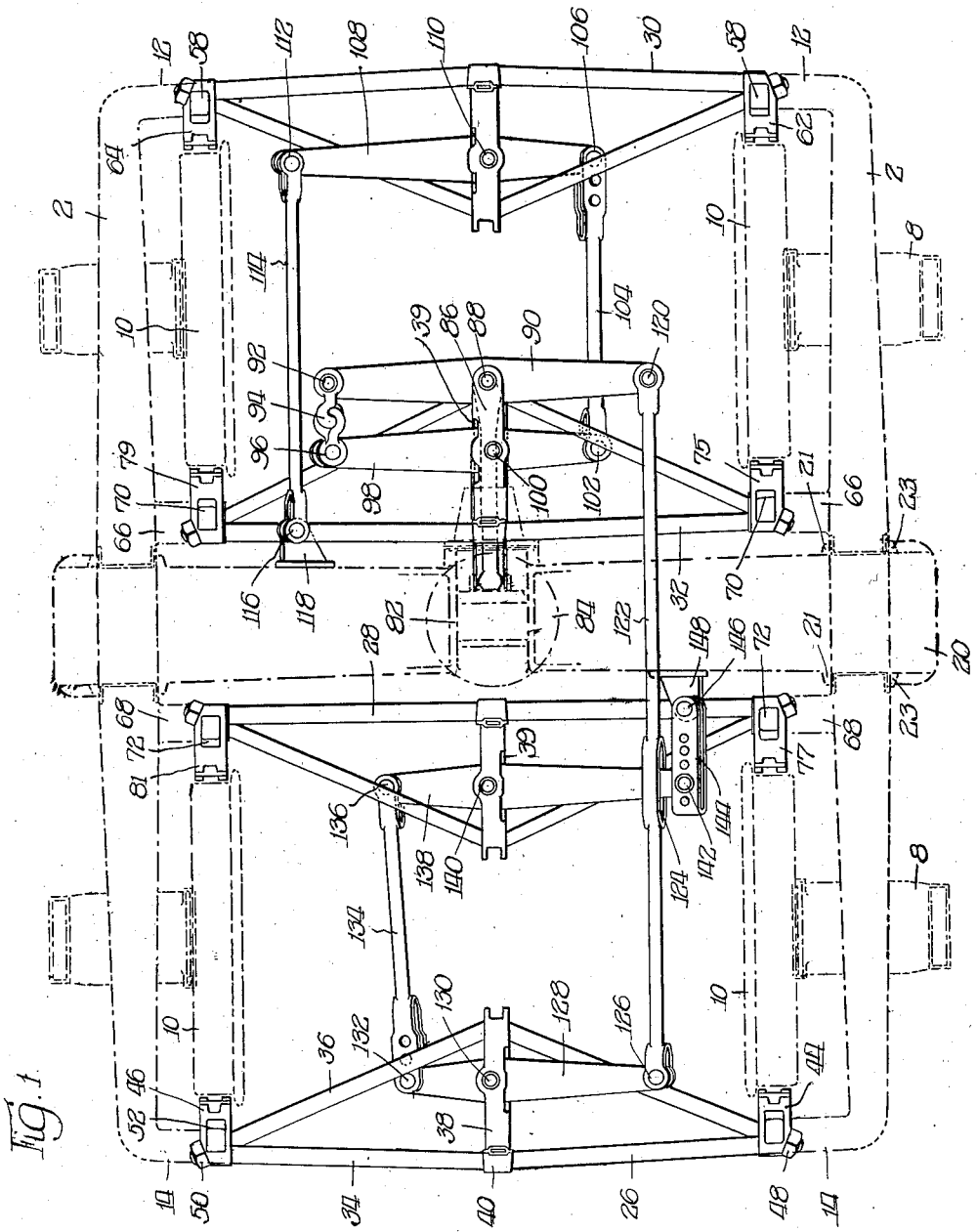
Inventor:
Walter H. Baselt,
By
atty Sept. 29, 1936.  W. H. BASELT  2,055,959
CLASP BRAKE
Filed Dec. 28, 1935  2 Sheets-Sheet 2
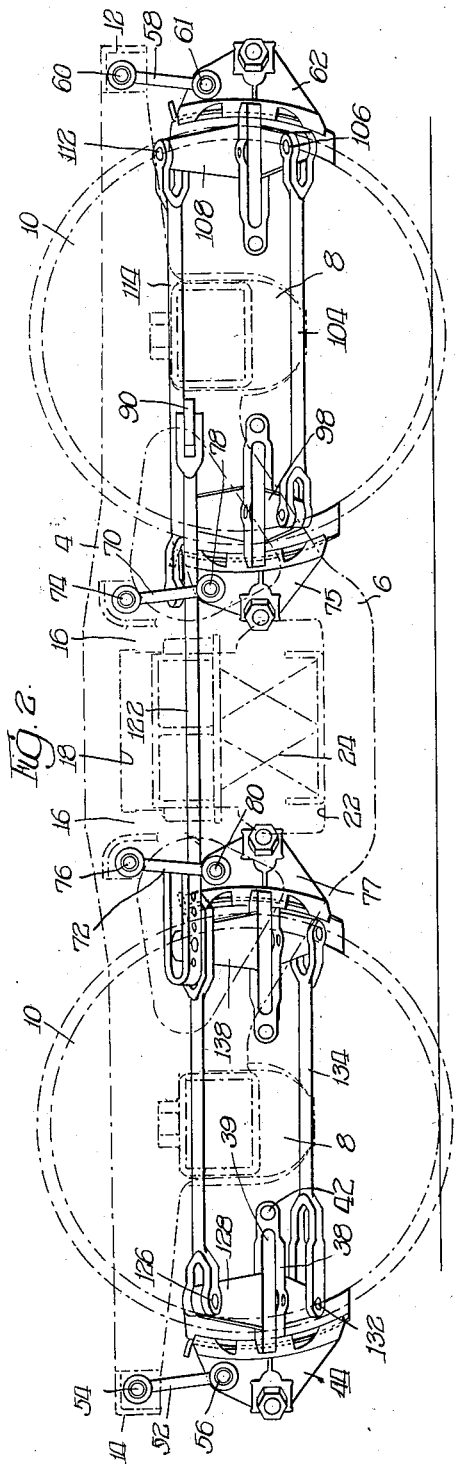
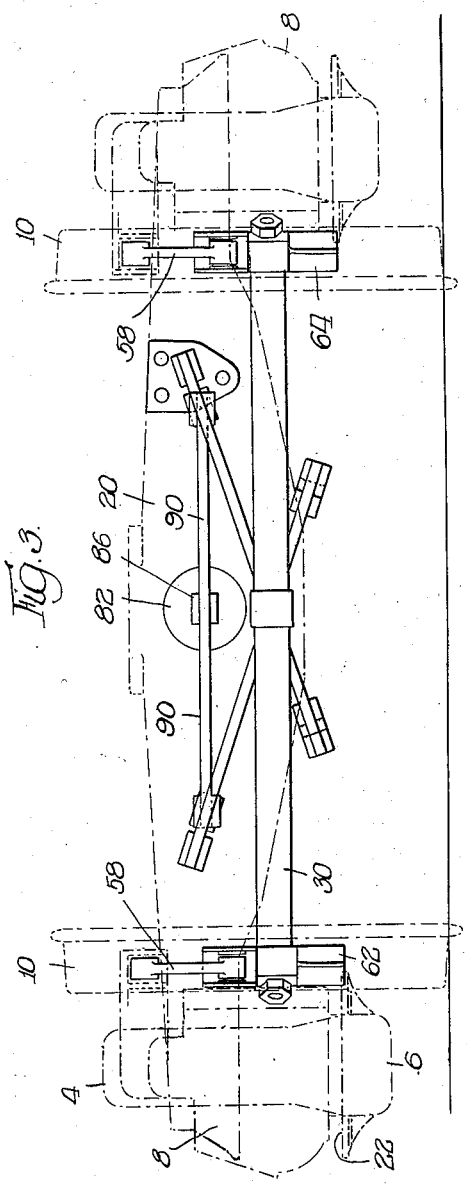
Inventor:
Walter H. Baselt,
By Orin O. B. Garner
atty.

Patented Sept. 29, 1936

2,055,959

UNITED STATES PATENT OFFICE 2,055,959

CLASP BRAKE

Walter H. Baselt, Chicago, Ill., assignor to American Steel Foundries, Chicago, Ill., a corporation of New Jersey Application December 28, 1935, Serial No. 56,515

23 Claims. (Cl. 188—56)

This invention relates to brake rigging for a railway car truck and more particularly to the type of rigging wherein brake heads and brake shoes are applied to both sides of each wheel, commonly known as clasp brakes.

An object of my invention is to provide such a brake system wherein power means shall be integrally formed within a portion of the truck frame.

Still another object of my invention is to provide a clasp brake rigging wherein the brake cylinder is integrally formed within the load carrying member of the truck, thus conserving space which would not be otherwise utilized.

Still another object of my invention is to provide a clasp brake arrangement for railway car trucks with power means integrally formed within a portion of the truck frame and brake rigging connected to the said power means in a novel yet simple manner.

Still another object of my invention is to provide a clasp brake arrangement for a railway car truck with power means integrally formed within the load carrying member of the car truck and directly connected to the rigging at one side of said load carrying member together with fulcrum means on the opposite side of said load carrying member providing a fixed terminus for the rigging at the opposite side of the car truck.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a top plan view of a railway car truck embodying my invention;

Figure 2 is a side elevation of the truck construction shown in Figure 1; and

Figure 3 is an end elevation of the truck construction shown in Figure 1, the view being taken at the right of the structure as shown in Figure 1.

Describing this embodiment of my invention in more detail, a truck construction is shown consisting of side frames 2—2 of a well known design, commonly called a truss side frame, each having the compression member 4 and the tension member 6 joining at their ends with the integrally formed journal box 8 having the usual form of journaled connection (not shown) with wheel and axle assemblies 10 and extending beyond said journal box to provide a support for the brake rigging in the form of integral end brackets 12 and 14 at opposite ends of the truck frame. The usual columns 16 integrally join the tension and compression members near the middle portion of the frame and with them form the window opening 18 within which is received the end of the load carrying member 20, the load carrying member being supported with its inner and outer guide flanges 21 and 23 on the spring seat portion 22 by means of the resilient means 24 diagrammatically shown.

The brake rigging is of the beam type wherein the truss type brake beams 26 and 28 are supported for cooperative engagement with the wheel and axle assembly at the left of Figure 1 and similar beams 30 and 32 are supported for cooperative engagement with the wheel and axle assembly shown at the right of Figure 1. The truss type beams, identical in form, have the compression member 34, the tension member 36, the fulcrum 38 with the diagonally arranged brake lever slot 39, the integrally formed collar 40 at one end receiving the compression member 34 and the eye 42 at the opposite end through which may pass the tension member 36 the whole being secured in assembly, together with brake heads 44 and 46, by means of nuts 48 and 50 threaded on the ends of the tension member 36 which pass through the brake heads and are secured to the compression member in the usual manner. The brake rigging at this end of the car truck is supported by hangers 52 pivotally connected at their upper ends as at 54 to the side frame brackets 14 and at their lower ends as at 56 to the brake heads 44 and 46 at the opposite ends of the brake beam 26. Similarly, at the opposite end of the truck, hangers 58 are pivotally supported at their upper ends as at 60 to the brackets 12 on the ends of the side frames and at their lower ends pivotally connected as at 61 to the brake heads 62 and 64 carried on the opposite ends of the brake beam 30. Intermediate the wheels, brackets 66 and 68 are integrally formed on each side frame 2, thus providing support for the brake rigging between the wheels, hangers 70 and 72 having their upper ends pivotally connected as at 74 and 76 to the brackets 66 and 68 respectively and their lower ends pivotally connected as at 78 and 80 to the brake heads 75 and 77 mounted respectively at one end of the beams 32 and 28 and to brake heads 79 and 81 mounted respectively on the opposite ends of the brake beams 32 and 28.

The cylinder 82 is integrally formed within the load carrying member 20 at its middle portion under the center plate 84 and on the longitudinal center line of the truck. The piston 86 has its outer end pivotally connected as at 88 to the midpoint of the horizontally arranged equalizing lever 90, one end of said equalizing lever 90 being connected as at 92 to clevis means 94, the opposite end of the clevis means being pivotally connected as at 96 to the diagonally arranged brake lever 98. The brake lever 98 passes through the slot 39 of the fulcrum 38 forming a part of the brake beam 32 and is pivotally secured to the said fulcrum as at 100. The opposite end of the brake lever 98 is pivotally connected as at 102 to the pull rod 104 the other end of the pull rod 104 being pivotally and adjustably connected as at 106 to the diagonally arranged brake lever 108 which passes through the slot of the fulcrum forming a portion of the brake beam 30 and is pivotally secured thereto at an intermediate point of the lever 108 as at 110. The opposite end of the brake lever 108 is pivotally connected as at 112 to the pull rod 114 and the other end of the pull rod 114 is pivotally connected as at 116 to the bracket 118 which thus provides a fulcrum on the load carrying member 20.

Referring once more to the equalizing lever 90, its opposite end is pivotally connected as at 120 to the pull rod 122 said pull rod having at an intermediate point slot means 124 and being pivotally connected as at 126 to the diagonally arranged brake lever 128 which is received within the slot 39 of the fulcrum forming a part of the brake beam 26 and is pivotally secured therein as at 130. The opposite end of the brake lever 128 is pivotally and adjustably connected as at 132 to the pull rod 134 whose opposite end is pivotally connected as at 136 to the diagonally arranged brake lever 138 which is received within the slot 39 of the fulcrum forming a part of the brake beam 28 being pivotally secured therein as at 140. The opposite end of the brake lever 138 passes through the elongated slot 124 of the pull rod 122 and is pivotally and adjustably connected as at 142 to the U-shaped strap 144 which in turn is pivotally fulcrumed as at 146 to the bracket 148 integrally formed, or otherwise secured, on the load carrying member 20.

In operation, actuation of the piston 86 by the power means 82 will move the equalizing lever 90 in a clockwise direction about the pivot point 120 this movement being transmitted to the brake lever 98 through clevis means 94 and causing the brake lever 98 to rotate in a clockwise direction about the point 100, thus moving the pull rod 104 to the left and causing the brake lever 108 to rotate in a clockwise direction about the point 112. This movement of the brake lever 108 through its connection at the pivot point 110 with the brake beam 30 moves the brake beam 30 to the left and brings into engagement against the periphery of the associated wheels the brake shoes mounted on the brake heads 62 and 64. Continued actuation will cause the brake lever 98 to rotate about the point 102 in a clockwise direction, thus moving to the right the brake beam 32 and bringing into bearing against the opposite sides of the wheels the brake shoes mounted on the brake heads 75 and 79. Continued actuation of the power means will cause the equalizing lever 90 to pivot in a colunter-clockwise direction about the point 92, thus moving the pull rod 122 to the right and causing the brake lever 128 to rotate in a counter-clockwise direction about the point 132, thus moving the brake beam 26 to the right and bringing the brake shoes carried by the brake heads 44 and 46 into engagement against the associated peripheries of the wheels. Continued actuation will cause the brake lever 128 to rotate in a counter-clockwise direction about the point 130, thus causing movement of the pull rod 134 to the left and rotating the brake lever 138 in a counter-clockwise direction about the pivot 142 and causing the brake beam 28 to move to the left thus bringing the brake shoes carried on the brake heads 77 and 81 into bearing against the periphery of the last mentioned wheels on their opposite sides.

It will be understood of course that these various movements occur simultaneously and almost instantaneously with the actuation of the power means.

Release of the power means will cause movement of the various parts in directions the reverse af those just described, thus releasing the brakes.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:
1. In brake rigging for a railway car truck the combination of a truck frame comprising side frames and a transverse load carrying member, power means integrally formed within said load carrying member, truss type brake beams, including fulcrums, applied at opposite sides of each pair of car wheels, brake heads and brake shoes mounted on said brake beams, brake levers pivoted in the fulcrums associated with the beams applied to one pair of car wheels, a pull rod connecting said levers at one end, the opposite end of one of said levers being fulcrumed on said load carrying member and the opposite end of the other of said levers being connected by a pull rod to one end of an equalizer, other brake levers pivoted in the fulcrums associated with the brake beams at the opposite end of said car truck, and a pull rod adjustably connecting said last mentioned brake levers at one end, the opposite end of one of said last mentioned levers being fulcrumed on said load carrying member and the opposite end of the other of said last mentioned levers being operatively connected to said equalizer.

2. In a brake rigging for a four wheel railway car truck the combination of a truck frame comprising side frames and a load carrying member connecting said side frames, power means integrally formed within said load carrying member, truss type brake beams, including fulcrums, applied to opposite sides of each pair of car wheels, brake levers pivoted in each of said fulcrums, the brake levers of each pair of brake beams being connected at one end by a pull rod and one of said levers of each pair being fulcrumed on said load carrying member, the other brake levers of said pairs being operatively connected to opposite ends of an equalizer, and an operative connection between said equalizer and said power means.

3. In clasp brake rigging for four wheel railway car trucks the combination of a truck frame comprising side frames, a load carrying member connecting said side frames and including power means integrally formed therein on the longitudinal center line of said truck, wheel and axle assemblies journaled in said side frames, truss type brake beams, including fulcrums, applied to opposite sides of each of said assemblies, and a brake lever pivoted in each of said fulcrums, pairs of said brake levers being connected to each other at one end by a pull rod and having their opposite ends respectively fulcrumed on said load carrying member and operatively connected to an equalizer, said power means having an operative connection to said equalizer for operation of said brake rigging.

4. In clasp brake rigging for a four wheel railway car truck comprising side frames with integral journal boxes, a load carrying member with integrally formed power means connecting said side frames, wheel and axle assemblies journaled in said side frames, and brake mechanism, including brake beams applied to opposite sides of each of said assemblies, a brake lever fulcrumed on each of said beams, the levers associated with each pair of beams being connected at one end by a pull rod and having their opposite ends respectively fulcrumed on said load carrying member and operatively connected to an equalizer, and an operative connection between said equalizer and said power means.

5. In a brake rigging for a four wheel railway car truck the combination of a truck frame including a load carrying member having integrally formed power means, brake beams supported at opposite sides of each pair of car wheels, and a brake lever fulcrumed on each of said beams, the brake levers associated with each pair of brake beams being operatively connected at one end to each other and respectively connected at their opposite ends to said load carrying member and to an equalizer, said equalizer having an operative connection to said power means for actuation of said brake mechanism.

6. In brake rigging for a railway car truck the combination of a truck frame comprising side frames and a transverse load carrying member, power means integrally formed within said load carrying member, truss type brake beams, including fulcrums, applied at opposite sides of each pair of car wheels, brake heads and brake shoes mounted on said brake beams, brake levers pivoted in the fulcrums associated with the beams applied to one pair of car wheels, a pull rod connecting said levers at one end, the opposite end of one of said levers being fulcrumed on said load carrying member and the opposite end of the other of said levers being connected by a pull rod to one end of an equalizer, other brake levers pivoted in the fulcrums associated with the brake beams at the opposite end of said car truck, a pull rod adjustably connecting said last mentioned brake levers at one end, the opposite end of one of said last mentioned levers being fulcrumed on said load carrying member and the opposite end of the other of said last mentioned levers being operatively connected to said equalizer, and a connection between said power means and said equalizer.

7. In brake rigging for a railway car truck the combination of a truck frame comprising side frames and a transverse load carrying member, power means integrally formed within said load carrying member, truss type brake beams, including fulcrums, applied at opposite sides of each pair of car wheels, brake heads and brake shoes mounted on said brake beams, brake levers pivoted in the fulcrums associated with the beams applied to one pair of car wheels, a pull rod connecting said levers at one end, the opposite end of one of said levers being fulcrumed on said load carrying member and the opposite end of the other of said levers being connected by a pull rod to one end of an equalizer, other brake levers pivoted in the fulcrums associated with the brake beams at the opposite end of said car truck, and a pull rod adjustably connecting said last mentioned brake levers at one end, the opposite end of one of said last mentioned levers being fulcrumed on said load carrying member and the opposite end of the other of said last mentioned levers being operatively connected to said equalizer, said power means having a piston operatively connected to said equalizer for operation of said brake rigging.

8. In a brake rigging for a four wheel railway car truck the combination of a truck frame including a load carrying member having integrally formed power means, brake beams supported at opposite sides of each pair of car wheels, and a brake lever fulcrumed on each of said beams, the brake levers associated with each pair of brake beams being operatively connected at one end to each other and respectively connected at their opposite ends to said load carrying member and to an equalizer, one of said connections to said equalizer comprising a pull rod passing through said load carrying member, said equalizer having an operative connection to said power means for actuation of said brake mechanism.

9. In brake rigging for a railway car truck the combination of a truck frame comprising side frames and a transverse load carrying member, power means integrally formed within said load carrying member, truss type brake beams, including fulcrums, applied at opposite sides of each pair of car wheels, brake heads and brake shoes mounted on said brake beams, brake levers pivoted in the fulcrums associated with the beams applied to one pair of car wheels, a pull rod connecting said levers at one end, the opposite end of one of said levers being fulcrumed on said load carrying member and the opposite end of the other of said levers being connected by a pull rod to one end of an equalizer, other brake levers pivoted in the fulcrums associated with the brake beams at the opposite end of said car truck, and a pull rod adjustably connecting said last mentioned brake levers at one end, the opposite end of one of said last mentioned levers being fulcrumed on said load carrying member and the opposite end of the other of said last mentioned levers being operatively connected to said equalizer, said power means having a piston pivotally connected to the mid-point of said equalizer for operation of said brake rigging.

10. In a brake rigging for a four wheel railway car truck the combination of a truck frame comprising side frames and a load carrying member connecting said side frames, power means integrally formed within said load carrying member, truss type brake beams, including fulcrums, applied to opposite sides of each pair of car wheels, and brake levers pivoted in each of said fulcrums, the brake levers of each pair of brake beams being connected at one end by a pull rod and one of said levers of each pair being fulcrumed on said load carrying member, the other brake levers of said pairs being operatively connected to opposite ends of an equalizer, said power means having a piston pivotally connected to the mid-point of said equalizer for operation of said brake rigging.

11. In a brake rigging for a four wheel railway car truck the combination of a truck frame comprising side frames and a load carrying member connecting said side frames, power means integrally formed within said load carrying member, truss type brake beams, including fulcrums, applied to opposite sides of each pair of car wheels, brake levers pivoted in each of said fulcrums, the brake levers of each pair of brake beams being connected at one end by a pull rod and one of said levers of each pair being fulcrumed on said load carrying member, the other brake lever of one of said pairs being connected to an equalizer by a pull rod extending through said load carrying member, and a connection between said equalizer and the other brake lever of the other of said pairs.

12. In a brake rigging for a four wheel railway car truck the combination of a truck frame comprising side frames and a load carrying member connecting said side frames, power means integrally formed within said load carrying member, truss type brake beams, including fulcrums, applied to opposite sides of each pair of car wheels, brake levers pivoted in each of said fulcrums, the brake levers of each pair of brake beams being connected at one end by a pull rod and one of said levers of each pair being fulcrumed on said load carrying member, the other brake lever of one of said pairs being connected to an equalizer by a pull rod extending through said load carrying member, and a connection between said equalizer and the other brake lever of the other of said pairs, said last mentioned pull rod having a slot intermediate its ends for the reception of one of said brake levers.

13. In a brake rigging for a four wheel railway car truck the combination of a truck frame comprising side frames and a load carrying member connecting said side frames, power means integrally formed within said load carrying member, truss type brake beams, including fulcrums, applied to opposite sides of each pair of car wheels, brake levers pivoted in each of said fulcrums, the brake levers of each pair of brake beams being connected at one end by a pull rod and one of said levers of each pair being fulcrumed on said load carrying member, the other brake lever of one of said pairs being connected to an equalizer by a pull rod extending through said load carrying member, and a connection between said equalizer and the other brake lever of the other of said pairs, said last mentioned pull rod having a slot intermediate its ends for the reception of one of said brake levers, and a connection between said power means and said equalizer for operation of said brake rigging.

14. In clasp brake rigging for four wheel railway car trucks the combination of a truck frame comprising side frames, a load carrying member connecting said side frames and including power means integrally formed therein on the longitudinal center line of said truck, wheel and axle assemblies journaled in said side frames, truss type brake beams, including fulcrums, applied to opposite sides of each of said assemblies, and a brake lever pivoted in each of said fulcrums, pairs of said brake levers being connected to each other at one end by a pull rod and having their opposite ends respectively fulcrumed on said load carrying member and operatively connected to an equalizer, the connection between one of said levers and said equalizer being a pull rod passing through said load carrying member.

15. In clasp brake rigging for four wheel railway car trucks the combination of a truck frame comprising side frames, a load carrying member connecting said side frames and including power means integrally formed therein on the longitudinal center line of said truck, wheel and axle assemblies journaled in said side frames, truss type brake beams, including fulcrums, applied to opposite sides of each of said assemblies, and a brake lever pivoted in each of said fulcrums, pairs of said brake levers being connected to each other at one end by a pull rod and having their opposite ends respectively fulcrumed on said load carrying member and operatively connected to an equalizer, the connection between one of said levers and said equalizer being a pull rod passing through said load carrying member, said power means having a piston operatively connected to said equalizer for actuation of said brake rigging.

16. In clasp brake rigging for four wheel railway car trucks the combination of a truck frame comprising side frames, a load carrying member connecting said side frames and including power means integrally formed therein on the longitudinal center line of said truck, wheel and axle assemblies journaled in said side frames, truss type brake beams, including fulcrums, applied to opposite sides of each of said assemblies, a brake lever pivoted in each of said fulcrums, pairs of said brake levers being connected to each other at one end by a pull rod and having their opposite ends respectively fulcrumed on said load carrying member and operatively connected to an equalizer, the connection between one of said levers and said equalizer being a pull rod passing through said load carrying member, said pull rod having a slot intermediate its ends for the reception of one of said levers.

17. In clasp brake rigging for four wheel railway car trucks the combination of a truck frame comprising side frames, a load carrying member connecting said side frames and including power means integrally formed therein on the longitudinal center line of said truck, wheel and axle assemblies journaled in said side frames, truss type brake beams, including fulcrums, applied to opposite sides of each of said assemblies, a brake lever pivoted in each of said fulcrums, pairs of said brake levers being connected to each other at one end by a pull rod and having their opposite ends respectively fulcrumed on said load carrying member and operatively connected to an equalizer, the connection between one of said levers and said equalizer being a pull rod passing through said load carrying member, said pull rod having a slot intermediate its ends for the reception of one of said levers, the fulcrum connection between said last mentioned lever and said load carrying member comprising a slotted strap adjustably connected to said last mentioned lever and pivotally secured to said load carrying member.

18. In clasp brake rigging for a four wheel railway car truck comprising side frames with integral journal boxes, a load carrying member with integrally formed power means connecting said side frames, wheel and axle assemblies journaled in said side frames, and brake mechanism including brake beams applied to opposite sides of each of said assemblies, a brake lever fulcrumed on each of said beams, the levers associated with each pair of beams being connected at one end by a pull rod and having their opposite ends respectively fulcrumed on said load carrying member and operatively connected to an equalizer, one of said connections to said equalizer comprising a pull rod passing through said load carrying member, and an operative connection between said equalizer and said power means.

19. In clasp brake rigging for a four wheel railway car truck comprising side frames with integral journal boxes, a load carrying member with integrally formed power means connecting said side frames, wheel and axle assemblies journaled in said side frames, and brake mechanism including brake beams applied to opposite sides of each of said assemblies, a brake lever fulcrumed on each of said beams, the levers associated with each pair of beams being connected at one end by a pull rod and having their opposite ends respectively fulcrumed on said load carrying member and operatively connected to an equalizer, one of said connections to said equalizer comprising a pull rod passing through said load carrying member, said last mentioned pull rod having a slot intermediate its ends for the reception of one of said levers, and an operative connection between said equalizer and said power means.

20. In a brake rigging for a four wheel railway car truck the combination of a truck frame including a load carrying member having integrally formed power means, brake beams supported at opposite sides of each pair of car wheels, a brake lever fulcrumed on each of said beams, the brake levers associated with each pair of brake beams being operatively connected at one end to each other and respectively connected at their opposite ends to said load carrying member and to an equalizer, one of said connections to said equalizer comprising a pull rod passing through said load carrying member, said last mentioned pull rod having a slot intermediate its ends for the reception of one of said levers, said equalizer having an operative connection to said power means for actuation of said brake mechanism.

21. In clasp brake rigging for four wheel railway car trucks the combination of a truck frame comprising side frames, a load carrying member connecting said side frames and including power means integrally formed therein on the longitudinal center line of said truck, wheel and axle assemblies journaled in said side frames, truss type brake beams, including fulcrums, applied to opposite sides of each of said assemblies, a brake lever pivoted in each of said fulcrums, pairs of said brake levers being connected to each other at one end by a pull rod and having their opposite ends respectively fulcrumed on said load carrying member and operatively connected to an equalizer, and an operative connection between said power means and said brake rigging.

22. In clasp brake rigging for a four wheel railway car truck comprising side frames with integral journal boxes, a load carrying member with integrally formed power means connecting said side frames, wheel and axle assemblies journaled in said side frames, and brake mechanism, including brake beams applied to opposite sides of each of said assemblies, a brake lever fulcrumed on each of said beams, the levers associated with each pair of beams being connected at one end by a pull rod and having their opposite ends respectively fulcrumed on said load carrying member and operatively connected to an equalizer, and an operative connection between said power means and said brake rigging.

23. In a brake rigging for a four wheel railway car truck the combination of a truck frame including a load carrying member having integrally formed power means, brake beams supported at opposite sides of each pair of car wheels, a brake lever fulcrumed on each of said beams, the brake levers associated with each pair of brake beams being operatively connected at one end to each other and respectively connected at their opposite ends to said load carrying member and to an equalizer, and an operative connection between said power means and said brake rigging.

WALTER H. BASELT.